United States Patent
O'Connell, Jr. et al.

(10) Patent No.: US 7,349,942 B1
(45) Date of Patent: * Mar. 25, 2008

(54) STORAGE MEDIUM HAVING A MANAGEABLE FILE DIRECTORY STRUCTURE

(75) Inventors: Conleth S. O'Connell, Jr., Austin, TX (US); Eric R. White, Austin, TX (US); N. Isaac Rajkumar, Austin, TX (US)

(73) Assignee: Vignette Corporation, Austin, TX (US)

( * ) Notice: Subject to any disclaimer, the term of this patent is extended or adjusted under 35 U.S.C. 154(b) by 821 days.

This patent is subject to a terminal disclaimer.

(21) Appl. No.: 10/334,515

(22) Filed: Dec. 31, 2002

Related U.S. Application Data

(63) Continuation of application No. 60/356,613, filed on Feb. 13, 2002.

(51) Int. Cl.
*G06F 15/16* (2006.01)
(52) U.S. Cl. .......................... 709/203; 711/3; 711/138; 711/202
(58) Field of Classification Search ................ 709/203, 709/213–216; 711/130, 3, 138, 202
See application file for complete search history.

(56) References Cited

U.S. PATENT DOCUMENTS

| | | | | |
|---|---|---|---|---|
| 5,202,982 | A | 4/1993 | Gramlich et al. ........... 395/600 |
| 5,473,772 | A | 12/1995 | Halliwell et al. ........... 395/650 |
| 5,504,879 | A | 4/1996 | Eisenberg et al. ........... 395/600 |
| 5,740,430 | A | 4/1998 | Rosenberg et al. ......... 395/616 |
| 5,893,140 | A | * | 4/1999 | Vahalia et al. .............. 711/118 |
| 5,894,554 | A | 4/1999 | Lowery et al. |
| 5,928,323 | A | 7/1999 | Gosling et al. |
| 6,041,334 | A | * | 3/2000 | Cannon ...................... 707/204 |
| 6,151,624 | A | 11/2000 | Teare et al. |
| 6,192,415 | B1 | 2/2001 | Haverstock et al. |
| 6,198,824 | B1 | 3/2001 | Shambroom |
| 6,272,492 | B1 | 8/2001 | Kay et al. |
| 6,408,360 | B1 | 6/2002 | Chamberlain et al. |
| 6,571,246 | B1 | 5/2003 | Anderson et al. |
| 6,571,259 | B1 | * | 5/2003 | Zheng et al. ............... 707/205 |
| 6,622,168 | B1 | 9/2003 | Datta |
| 6,651,217 | B1 | 11/2003 | Kennedy et al. |

(Continued)

OTHER PUBLICATIONS

Dasgupta, Partha, "Resource Location In Very Large Networks," IEEE, pp. 156-163, May 1994.

(Continued)

*Primary Examiner*—Nathan Flynn
*Assistant Examiner*—Mohammad Siddiqi
(74) *Attorney, Agent, or Firm*—Sprinkle IP Law Group

(57) ABSTRACT

A file-mapping method and system can better manage the number of items (i.e., files, subdirectories, or a combination of them) within any single directory within a storage medium. The method and system can be used to limit the number of items within the directory, direct content and content components to different directories, and provide an internally recognizable name for the filename. When searching the storage medium, time is not wasted searching what appears to be a seemingly endless list of filenames or subdirectory names within any single directory. A client computer can have requests for content fulfilled quicker, and the network site can reduce the load on hardware or software components. While the method and system can be used for nearly any storage media, the method and system are well suited for cache memories used with web servers.

22 Claims, 4 Drawing Sheets

U.S. PATENT DOCUMENTS

| | | |
|---|---|---|
| 6,697,844 B1 | 2/2004 | Chan et al. |
| 6,701,428 B1 | 3/2004 | Harvey, III et al. |
| 6,754,621 B1 | 6/2004 | Cunningham et al. |
| 6,757,708 B1 | 6/2004 | Craig et al. |
| 6,829,637 B2 | 12/2004 | Kokku et al. |
| 6,850,941 B1 | 2/2005 | White et al. |
| 7,024,452 B1 * | 4/2006 | O'Connell et al. ......... 709/203 |
| 2001/0032254 A1 | 10/2001 | Hawkins |
| 2001/0034771 A1 | 10/2001 | Hutsch et al. |
| 2002/0013779 A1 | 1/2002 | Sridhar |
| 2002/0016736 A1 | 2/2002 | Cannon et al. |
| 2002/0032906 A1 | 3/2002 | Grossman |
| 2002/0065912 A1 | 5/2002 | Catchpole et al. |
| 2002/0120677 A1 | 8/2002 | Goward et al. |
| 2002/0165877 A1 | 11/2002 | Malcolm et al. |
| 2002/0178187 A1 | 11/2002 | Rasmussen et al. |
| 2003/0120752 A1 | 6/2003 | Corcoran |
| 2003/0217117 A1 | 11/2003 | Dan et al. |
| 2004/0030697 A1 | 2/2004 | Cochran et al. |
| 2004/0205452 A1 | 10/2004 | Fitzsimmons et al. |

OTHER PUBLICATIONS

Vetter, Ronald, J., "Mosaic and the World-Wide Web," IEEE, pp. 49-57, Oct. 1994.

Obraczka et al., "Internet Resource Discovery Services," IEEE, p. 8-22, Sep. 1993.

Sharma et al., "Hypertext Based Distributed Object Management for Information Location and Retrieval," IEEE, pp. 102-107, 1993.

wysiwyg://101/http://msdn.microsof . . . brary/wcedoc/wcesecur/crypto_1.htm, pp. 1-2, 2001.

Turley, "Design Specification for Packaged Application Support in Assassin," pp. 2-6, 1999.

Turley, Functional Specification for Packaged Application Support in Assassin, pp. 2-6, 1999.

* cited by examiner

STORAGE MEDIUM HAVING A MANAGEABLE FILE DIRECTORY STRUCTURE

RELATED APPLICATIONS

This application claims priority under 35 U.S.C. § 119(e) to U.S. Patent Application No. 60/356,613, entitled "Cache Memory Having a Hierarchical Structure" by White et al., filed on Feb. 13, 2002. This application is related to U.S. patent application Ser. Nos. 09/931,228 entitled "Method and System For Determining a Network User's Locale" by White filed Aug. 16, 2001; 10/027,384 entitled "Method and System For Cache Management of Locale-Sensitive Content" by White et al. filed Dec. 21, 2001 (which issued as U.S. Pat. No. 7,194,506 on Mar. 20, 2007); and 10/028,232 entitled "Method and System for Platform-Independent File System Interaction" by White et al. filed Dec. 21, 2001 (which issued as U.S. Pat. No. 6,892,377 on May 10, 2005); and 10/195,798, entitled "Method and System for File-System Based Caching" by O'Connell et al., filed on Jul. 15, 2002 (which issued as U.S. Pat. No. 7,024,452 on Apr. 4, 2006). All applications listed in this paragraph are assigned to the current assignee hereof and are incorporated herein by reference.

FIELD OF THE INVENTION

This invention relates in general to methods and data processing system readable storage media, and more particularly, to those methods and data processing system readable storage media that manage the number of items within file directories and sub-directories.

DESCRIPTION OF THE RELATED ART

Content management within storage media of network sites is becoming more problematic as the volume of information exchanged over networks increases. The problems extend to all storage media including caches. Frequently accessed files may be cached to reduce the number of page regenerations. A larger cache memory typically means that web pages may be delivered faster to a client computer and use less server resources than would otherwise be needed in regenerating those web pages.

However, caching web pages is not without problems. In simple, persistent caches, cache files are stored in flat directory structures. In other words, the cache file directory has a listing of files within the cache without any hierarchy. For a UNIX-based server, the cache files consume "nodes." The UNIX file system has only a limited number of inodes that it can handle. Therefore, the total number of cached pages may be limited by the file system's technology and not by available storage resources (i.e., disk space).

For Windows NT-based servers, there is no specific limit on the number of files that can be stored within a cache. However, each file name may consume approximately 1 kB of disk space regardless of the size of contents within that cache file. Therefore, a relatively small file that may include only a few bytes of data still occupies approximately 1 kB of cache memory due to the file name. As the number of files increase, the amount of space occupied by the directory likewise increases. If the directory includes 100,000 files, the amount of space occupied by the file names themselves for the directory may exceed 100 MB.

Searching for files using a conventional, flat cache file directory can result in relatively slow searches as the server computer may need to check virtually every file name in the cache file directory before reaching the specific file requested or determining that the file was not found. This searching can consume valuable server computer resources and delay sending a response to a client computer with the file or a notification that the file could not be found. The increased use of server resources and increased time in sending a response to a client computer are undesired.

SUMMARY OF THE INVENTION

A file-mapping method and system can better manage the number of items (i.e., files, subdirectories, or a combination of them) within any single directory within a storage medium. The method and system can limit the number of items within the directory, direct content and content components to different directories, provide an internally recognizable name for the filename, and provide potentially other benefits. When searching the storage medium, time is not wasted searching what appears to be a seemingly endless list of filenames or subdirectory names within any single directory. A client computer can have requests for content fulfilled quicker, and the network site can reduce the load on hardware, software components, or any combination thereof.

In some embodiments, a method of using a storage medium can comprise generating a first mapped filename for a file to manage the number of files within a directory. The method can also comprise determining whether the file is in the storage medium by using the first mapped filename. Hierarchically, the directory in which the file resides may lie between a root directory of the storage medium and the file. In other words, the file may lie within the directory, itself, or a sub-directory (or an even lower-level directory) within that directory.

In still other embodiments, a data processing system readable medium can have code embodied within it. The code can include instructions that are configured to cause a data processing system for performing the methods described herein.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures, in which.

Figure 1:
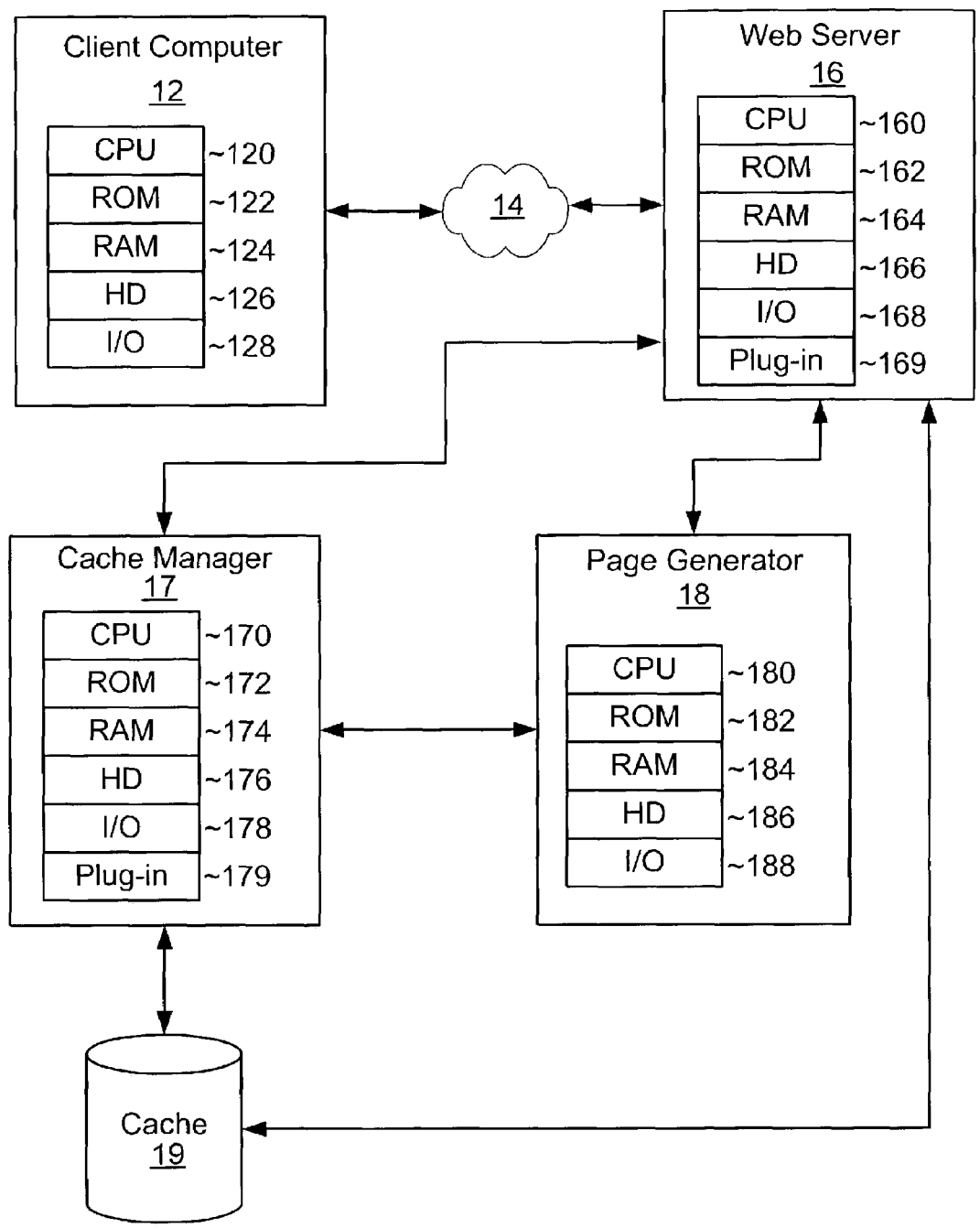
FIG. 1 includes an illustration of a client computer and a network site that are connected to each other via a network.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A file-mapping method and system can better manage the number of items (i.e., files, subdirectories, or any combination of them) within any single directory within a storage medium. The method and system can limit the number of items within the directory, direct content and content components to different directories, and provide an internally recognizable name for the filename. When searching the storage medium, time is not wasted searching what appears to be a seemingly endless list of filenames or subdirectory names within any single directory. A client computer can have requests for content fulfilled quicker, and the network site can reduce the load on hardware or software components. While the method and system are well suited for cache memories, the concepts can be used for many other file storage systems on other types of storage media including hard disks, CDs, floppy diskettes, and the like.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider. A network address includes information that can be used by a server computer to locate information, whether internal to that server computer or at a different, remote computer or database. Uniform Resource Locators ("URLs") are examples of network addresses.

The term "content" is intended to mean any information sent from a network site to a client computer in response to a request from a user at the client computer. As one example, content may be in the form of a network page. A web page is a common type of network page.

The term "content component" is intended to mean at least a portion of the content. In many instances, the content can include a plurality of content components. However, in some instances, the content can be a single content component.

The term "network site" is intended to comprise computers that are part of the network site in response to a request from a client computer. The client computer is outside the network site but may request content from the network site via communications with a web server. A web site is a common type of network site.

The term "software component" is intended to mean at least a portion of a computer program (i.e., a software application). Examples include a web server software component, a page generator software component, a cache manager, and the like. Different software components may reside in the same computer program or in different computer programs on the same computer or different computers.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Before discussing embodiments of the present invention, a hardware architecture for using embodiments is described. FIG. 1 illustrates an exemplary architecture and includes client computer 12 that is bi-directionally coupled to network 14, and web server 16 that is bi-directionally coupled to network 14, page generator 18, cache manager 17, and cache 19. Cache manager 17 can be bi-directionally coupled to page generator 18 and cache 19. Many other alternative configurations are possible and known to skilled artisans. For example, cache manager 17 is not required. In another alternative configuration, cache manager 17 may be unidirectionally coupled to web server 16. For example, cache manager 17 may send filenames of files that are stored within cache 19 to web server 16; however, no information or other communications may be sent from web server 16 to cache manager 17.

Client computer 12 includes central processing unit ("CPU") 120, read-only memory ("ROM") 122, random access memory ("RAM") 124, hard drive ("HD") or storage memory 126, and input/output device(s) ("I/O") 128. I/O 128 can include a keyboard, monitor, printer, electronic pointing device (e.g., mouse, trackball, stylus, etc.), or the like. Client computer 12 can include a desktop computer, a laptop computer, a personal digital assistant, a cellular phone, or nearly other device capable of communicating over the Internet or an intranet.

Web server 16 can include CPU 160, ROM 162, RAM 164, HD 166, I/O 168, and plug-in 169. Page generator 18 can include CPU 180, ROM 182, RAM 184, HD 186, and I/O 188. In one non-limiting embodiment, page generator 18 can be used to fulfill requests coming from web server 16. Cache manager 17 can include CPU 170, ROM 172, RAM 174, HD 176, I/O 178, and plug-in 179. Each of the computers in FIG. 1 may have more than one CPU, ROM, RAM, HD, I/O, or other hardware components. For simplicity, each computer is illustrated as having one of each of the hardware components, even if more than one is actually used.

Details of web server plug-in 169 and cache manager plug-in 179, which can be software modules, are described below in more detail. Plug-ins 169 and 179 are typically stored in HD 166 and HD 176, respectively, and loaded into RAM 164 and RAM 174, respectively, when used. Plug-ins 169 and 179 are illustrated as separate components to simplify understanding of the present invention.

Each of computers 12, 16, 17, and 18 is an example of a data processing system. ROM 122, 162, 172, and 182; RAM 124, 164, 174, and 184; HD 126, 166, 176, and 186; and cache 19 include media that can be read by CPU 120, 160, 170, or 180. Therefore, each of these types of memories includes a data processing system readable medium. These memories may be internal or external to computers 12, 16, 17, and 18.

Figure 2:
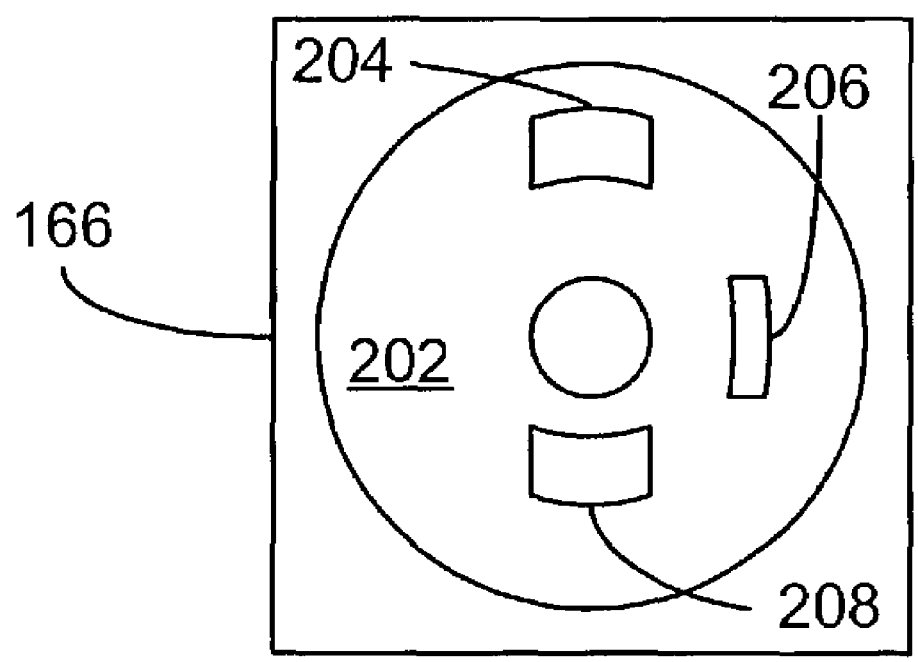
FIG. 2 includes an illustration of a data processing system storage medium including software code having instructions in accordance with an embodiment of the present invention.

The methods described herein may be implemented in suitable software code that may reside within ROM 122, 162, 172, or 182, RAM 124, 164, 174, or 184, or HD 126, 166, 176, or 186. The instructions in an embodiment of the present invention may be contained on a data storage device, such as HD 166 or 176. FIG. 2 illustrates a combination of software code elements 204, 206, and 208 that are embodied within data processing system readable medium 202, on HD 166. Alternatively, the instructions may be stored as software code elements on a DASD array, magnetic tape, floppy diskette, optical storage device, or other appropriate data processing system readable medium or storage device.

In an illustrative embodiment of the invention, the computer-executable instructions may be lines of compiled C++, Java, or other language code. Other architectures may also be used. For example, the functions of any one of the computers may be performed by another computer shown in FIG. 1. Additionally, a computer program or its software components may be embodied in more than one data processing system readable media in more than one computer. Further, other client computers (not shown) or other server computers (not shown) similar to client computer 12 and server computers 17, 16 and 18, respectively, may also be connected to network 14.

Figure 3:
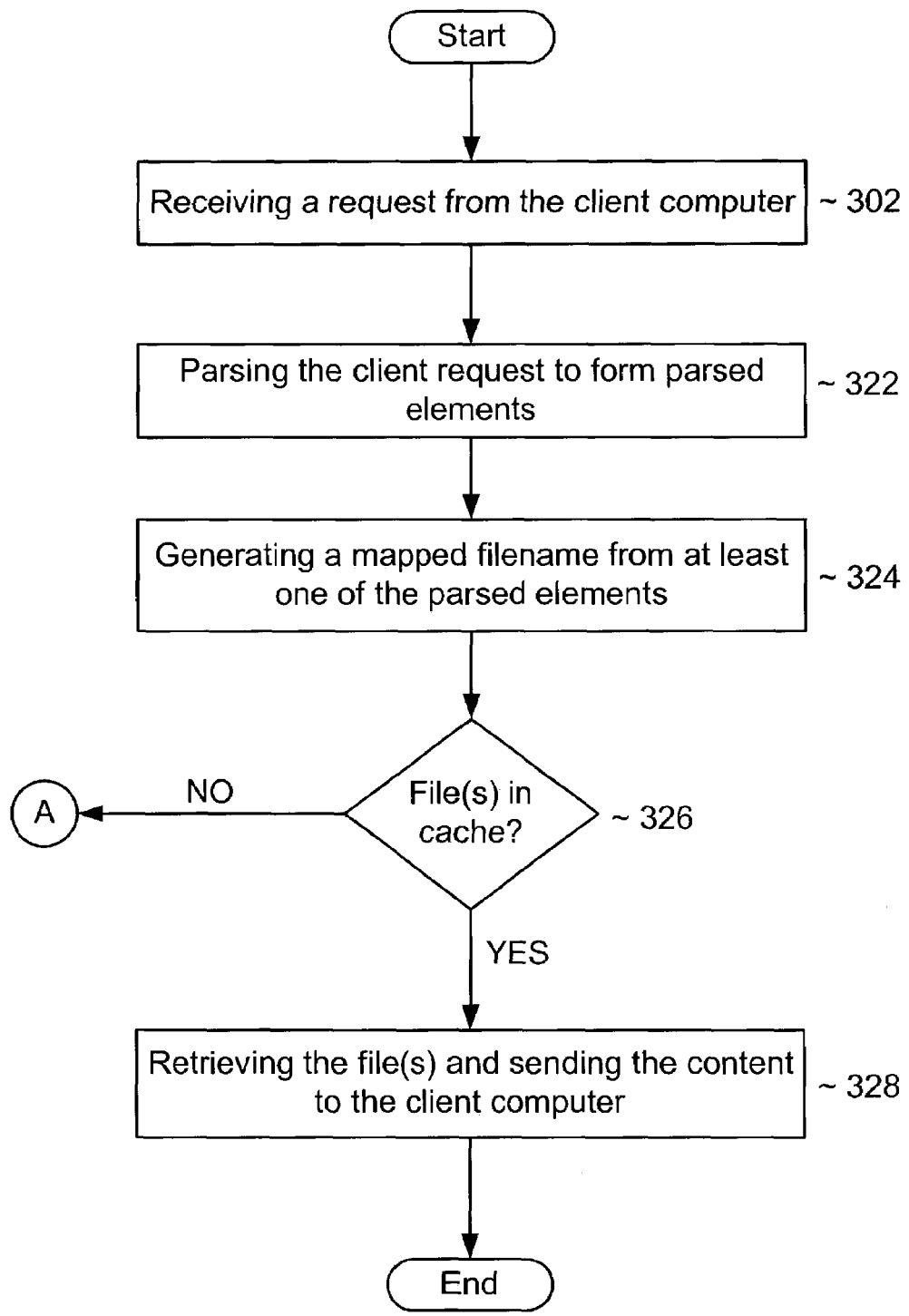
FIGS. 3 and 4 depict a process flow diagram for managing a file directory structure in accordance with an embodiment of the present invention.
Figure 4:
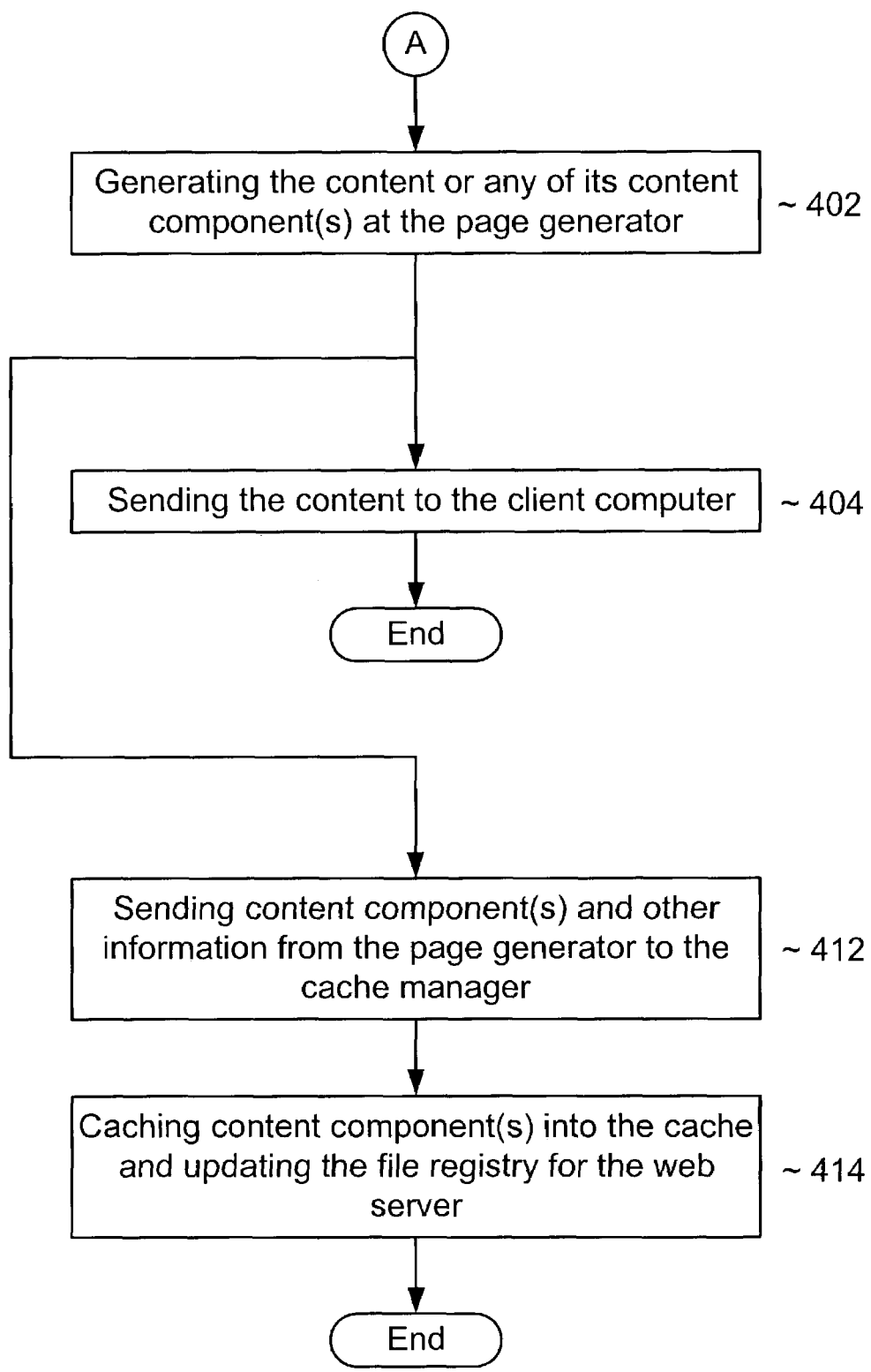

FIGS. 3 and 4 include illustrations, in the form of a flowchart, of the structures and operations of such software program(s) incorporating the features of the system and method as described herein. Note that the example as shown in FIGS. 3 and 4 is merely illustrative and not limiting. The methodology can be extended to other storage media. Examples with caches are given to simplify understanding of the concepts.

In the hardware configuration above, the various software components (e.g., web server, page generator, cache manager, or the like) are shown on separate server computers. In alternative embodiments, some or all of the software components may reside on the same server computer. For example, the web server software component and the page generator software component could reside on the same server computer. For simplicity, each of the software components in the embodiments described below resides on different server computers.

Communications between any of the computers in FIG. 1 can be accomplished using electronic, optical, radio-frequency, or other signals. When a user is at client computer 12, client computer 12 may convert the signals to a human understandable form when sending a communication to the user and may convert input from a human to appropriate electronic, optical, radio-frequency, or other signals to be used by the client computer 12 or server computer 16, 17, or 18. Similarly, when an operator is at server computer 16, 17, or 18, that server computer may convert the signals to a human understandable form when sending a communication to the user and may convert input from a human to appropriate electronic, optical, radio-frequency, or other signals to be used by server computer 16, 17, or 18 or client computer 12.

A quick overview of the process flow in FIGS. 3-4 is given before addressing details of the methodology. The method illustrated in FIGS. 3-4 is discussed with respect to the network site illustrated in FIG. 1.

As shown in FIG. 3, the method can comprise receiving a client request for content from client computer 12 (block 302). The method can further comprise parsing the client request to form parsed elements (block 322) and generating a mapped filename from at least one of the parsed elements (block 324). A focus of this specification is the process for generating the mapped filename. The process allows for the better management of the file directory structure within the cache. A determination can then be made whether the file(s) for the content component(s) is (are) in cache 19 (diamond 326). If the content is in cache 19, the method can further comprise retrieving the file(s) and sending content to client computer 12 (block 328). Otherwise ("No" branch of diamond 326), a cache miss has occurred.

When a cache miss has occurred, the method can comprise generating the content or any of its content component(s) at page generator 18 (block 402 of FIG. 4). The method may also comprise sending the content to client computer 12 (block 404). Any time after the content is generated, the method can still further comprise forwarding the content component(s) and other information from page generator 18 to cache manager 17 (block 412). The method can yet further comprise caching content component(s) into cache 19 and updating the file registry at web server 16 (block 414).

After reading this specification, skilled artisans will appreciate that some of the activities described in FIGS. 3-4 may not be required but may provide a more efficient network site. Also, some of the operations may be moved from one network site computer or software component to another network site computer or software component in order to return requested content to client computers faster. Attention is now turned to a more detailed description of the method illustrated in FIGS. 3-4 and its variants.

Before beginning the method illustrated in FIGS. 3-4, an operator at the network site may develop a software component for generating mapped filenames. The software component can be implemented with code represented by plug-in 169 on web server 16 and plug-in 179 on cache manager 17. In an alternative embodiment, only one of the plug-ins may be used, and the mapped filename generated by that plug-in may be sent to the other server computers at the network site for storage or retrieval purposes.

The software component may be designed to manage better the number of files within a single directory in the cache. For example, if the number of files within a directory is allowed to grow in an uncontrollable manner, a directory within cache 19 could exceed well over a million files, and potentially over a billion files. At some point, depending on the computer hardware and software configuration, searching for a file may be too long for acceptable performance, that is, returning content to client computer 12 within a reasonable time.

For example, an operator at the network site may set a predetermined limit on the number of items (i.e., files, subdirectories, or a combination of them) in any directory within cache 19 to be no more than approximately 1000, 4000, 16,000, or nearly any other number. Note that a specific numerical limit does not need to be set, although such a limit is easy to implement. The limit on the number of items within a directory may be universal (all directories within cache 19), determined on a basis of hierarchical level (i.e., a directory at the highest level below the root directory has no more than approximately 1000 items, and the lowest directory has no more than approximately 100 items), or determined on a directory-by-directory or other basis.

When the number of items, whether files, subdirectories, or combination of files and subdirectories, within a directory gets close to (e.g., 50% of the limit, 80% of the limit, 90% of the limit, etc.) or reaches the predetermined limit for that directory, a parallel directory (another directory at the same level coming from a common parent or root directory) or a sub-directory within that directory may be manually or automatically created. A more detailed description of static and dynamic directory structures are described later in this specification. Alternatively, a warning may be sent to an operator at server computer 16 or 17 to allow for manual intervention, if desired. New files or new subdirectories may go to that other subdirectory.

Implementation of the file mapping software component manages the cache file directory structure better than conventional methods. The design of the software component is highly flexible and can be customized for the specific needs or desires for the network site.

The mapping methodology can be better understood with some non-limiting examples. The mapping methodology can take the URL and other information within the user request (e.g., locale, browser, operating system, etc.), collectively "client request," and parse the client request into parsed elements that may correspond to different parameters. In general, the application-specific parameters may depend on the design of the content to be produced at a network site, and the non-application-specific parameters may not depend on the design of the content to be produced. Some of the parameters may be application-specific parameters (e.g., type of file (text versus image), scripting environment (Active Server Pages ("ASP") versus Java Server Pages ("JSP")), markup language (HyperText Markup Language ("HTML") versus Wireless Markup Language ("WML")), a query string, or the like), and some of the parameters may not be application-specific (e.g., locale, browser, operating system, address (e.g., Internet Protocol address) or other information about client computer 12 or network 14 over which the request is sent to web server 16). The parsing is highly flexible and can be adapted differently to different network sites.

Attention is directed to the detail of the method starting on FIG. 3. A user at client computer 12 can send and web server 18 can receive a client request including a URL (block 302). As an example of the URL portion of the client request can be "http://www.homedepot.com/diy_main/pg_diy.jsp?CNTKEY=growit". The method can further comprise parsing the client request to form parsed elements that may correspond to different parameters.

The method can comprise generating a mapped filename from at least one of the parsed elements (block 324). One format can comprise a naming convention that uses concatenation of the parsed elements with commas to separate the fields. For example, "0,CNTKEY=growit,00-EN_US.html" may be the mapped filename. A software component, such as plug-in 169, may analyze the parsed elements. For example, the "0" may correspond to an Internet Explorer™ brand browser (available from Microsoft Corporation of Redmond, Wash.) at client computer 12, "CNTKEY=growit" may correspond to a query string, "00-EN_US" may correspond to locale information of client computer 12, and "html" may correspond to the markup language.

In one example, one or more of the non-application-specific parameters can be used to determine the directory or subdirectory where the file will be located. In the prior example, the locale information may be used to determine a first level directory. A lower-level directory may be obtained using a hashing function to manage better the number of files within a directory depending on the specific hardware and software configuration used at the network site. The hashing function may be applied over the parameters in the parsed elements. For example, the mapped filename might become "EN_US/hash00345/CNTKEY=growit.html". Therefore, "EN_US" is a directory that includes a subdirectory called "hash00345," which includes a file "CNTKEY=growit.html." Note that the value of one of the parameters (locale is EN_US) corresponds to the name of the directory ("EN_US"), and another directory ("hash00345") has a name corresponding to the hashed value. Hashing may be performed at each level of directories within the hierarchy.

Alternatively, the order of the parameters may be changed. For example, the specific hash value may precede other information from the client request. Referring to the prior example, the mapped filename could be "hash00345/EN_US/CNTKEY=growit.html". Other orderings for the parameters are possible.

The logic used for generating the mapped filename should be known by the software components in the network site for accessing, generating, and storing cached content, but a particular methodology, such as using a hashing function or concatenation, is not required to achieve the caching or storing capabilities described herein. Concatenation of parameters and hashing are just a couple of many possible methodologies. After reading this specification, skilled artisans will appreciate that many other methodologies can be used.

After the mapped filename has been generated, the method can further include determining whether the file(s) is (are) in cache 19 (diamond 326). This determination can be performed using a conventional method. In one embodiment, after generating the mapped filename, web server 16 can refer to a file registry within web server 16 to determine if the mapped filename corresponds to (i.e., matches) a file within cache 19. If at least one file matches the mapped filename, the method can comprise retrieving the file(s) and sending it (them) to client computer 12 (block 328). The methodology used to generate the mapped filename helps to keep the number of files within any one directory at a more manageable level. On average, searching cache 19 is significantly faster compared to the conventional flat file system that may have millions of files within a single directory. At this point, the method may end.

If any file corresponding to the content is not within the cache ("No" branch of diamond 326), the method can further comprise generating the content or any of its content component(s) at page generator 18 (block 402 in FIG. 4). Page generator 18 can generate the network page or any of its content components that were not in cache 19. Web server 16 can receive content or content component(s) from cache 19, page generator 18, or both. The method can further comprise sending the content to client computer 12 (block 404).

Assuming content component(s) were generated by page generator 18, the method can further comprise forwarding the generated content, content component(s), other information, or any combination thereof from page generator 18 to cache manager 17 (block 412). Note that forwarding the generated content, etc. may occur after the content is sent to client computer 12 (block 404). Alternatively, web server 16 may cache the results or forward the results to cache manager 17.

The method can include caching content component(s) at location(s) corresponding to the mapped filename(s) and updating the file registry for web server 16 (block 414). Note that caching a content component should be construed to include adding to or updating an entry within a database. Cache manager 17 may have plug-in 179 can be used to recreate the mapped filename based on a client request or may be able to take a mapped filename and use a reverse function to determine at least a portion of the client request. Therefore, the other information sent to cache manager 17 could include the client request, parsed elements, the mapped filename, or potentially other information.

Content components can be stored independent of the memory location for the network pages in which they may be used. Some of the content components (i.e., files) may be used in other network pages. Storing multiple copies of the same information occupies additional memory space and slows retrieval of this or other content component(s) since the number of stored files may be greater. Therefore, the number of copies of the content component will be less than the number of network pages in which the content component is used, and may be as little as one copy of the component. Also, content component(s) may be stored within different directories independent of other content component(s) within the same network page. The mapping methodology can achieve the independent storing by assigning the network page and any of its content components to different directories. This can allow better control over the number of files within each discrete directory and speed the read access time for the content component. Additionally, quicker retrieval can translate to quicker delivery of already stored content.

An advantage of the method and system may occur by using the file-mapping methodology to manage better the number of files within any single directory. Because the number of files is kept below predetermined limits, the time to search the files within a directory can be significantly shorter. If files are within the memory, they may be found quicker. If the files are not in the memory, a determination that a file is not found is quicker, and the page generator can receive an instruction to generate content sooner than it otherwise would. From the perspective of the client computer 12, it is getting content returned by the network site faster. From the perspective of the network site, the web server 16 is not being slowed down by searching for file names within seemingly endless directory(ies). Therefore, fewer hardware resources may be needed when the method is used and still provide acceptable fulfillment of client requests. Similarly, the load on the web server software component can be reduced because it may be spending less time performing searches.

As previously mentioned, the methodology is not limited to caches used with web servers. The methodology may be used for other types of memories and storage media and may be used in applications outside of web servers. The storage medium may include RAM, a database, a file server, or the like. For the database, the parameters from parsing may be used for indexing and partitioning the content. The RAM, database, or file server can be used to implement the storage, but use of the parameters can help to make the storage more efficient. The directory structure may be managed using dependent or independent variables (with respect to the file contents) and manipulating the hierarchy. The management allows flexibility to add, delete, or otherwise modify or reconfigure a file directory system to meet the changing needs or desires of a user.

Note that the method may be implemented in a static (manually created and modified) directory structure or a dynamic (automatically created or modified) directory structure. In order to use a static directory structure, a user may estimate the number of files to be stored within a data processing system storage medium. For example, cache 17 may need to store up to 30 million personal home pages for subscribers. The user can create a directory structure to distribute the files between directories and sub-directories, if any. Files can be stored in the data processing system storage medium in accordance with the directory structure.

In one embodiment, the directory structure may include approximately 250 directories each having approximately 1000 subdirectories, and each subdirectory may be designed to have up to approximately 1000 files. This directory structure can handle up to approximately 250 million files. Therefore, the directory structure can accommodate the estimated 30 million personal home pages.

The static method can be implemented without having to generate code for creating or modifying directories and subdirectories. However, it may not adjust in real time for a situation where one or more of the subdirectories become full. If the estimated number of files is increased from 30 million to 300 million, the highest level of directories may be changed from approximately 250 to 1000 directories. Each directory may still have approximately 1000 subdirectories that may hold up to approximately 1000 files. The statically modified directory structure may now hold approximately one billion files.

As an alternative to a static file structure, a dynamic file structure may dynamically create or modify the directory structure in real time without manual intervention. As previously discussed, code can be written to add new directories at the same or lower levels based on how many files lie within any current specific directory. Alternatively, code can be written to adjust for underutilized folders. For example, some of the lowest level directories or subdirectories may contain nothing (i.e., no files or subdirectories) or almost nothing. Therefore, empty or sparsely populated directories may be combined into one higher-level directory.

Regardless whether a static or dynamic file system is used, the method can be used to add or remove level(s) within a directory structure or add or remove directories at any specific level. In other words, the directory structure may be vertically or horizontally modified as desired.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method of using a cache comprising:
   generating a first mapped filename for a first file to manage the number of files within a first directory of the cache; and
   determining whether the first file is in the cache by using the first mapped filename, wherein content within the cache is arranged hierarchically in a directory structure based on the distribution of content within the cache and the directory structure of the cache is dynamically re-configured based on the distribution of the content within the cache.

2. The method of claim 1, further comprising:
   receiving a client request from a client computer; and
   parsing the client request to form a parsed element that represents a value of a first parameter,
   wherein the value of the first parameter corresponds to a name of the first directory.

3. The method of claim 2, further comprising hashing the parsed element to form a hashed value, wherein:
   a second directory has a name corresponding to the hashed value;

the second directory is a subdirectory of the first directory; and the first file lies within the second directory.

4. The method of claim 3, wherein the first parameter is a non-application-specific parameter, and the hashed value is generated from an application-specific parameter.

5. The method of claim 3, wherein:

the first parameter is a locale, an operating system, a browser, or an address of the client computer; and the hashed value is generated from a type of file, a scripting environment, a markup language, or a query string.

6. The method of claim 1, further comprising:

receiving a client request;

parsing the client request to form a parsed element; and hashing the parsed element to form a hashed value, wherein the hashed value corresponds to a name of the first directory.

7. The method of claim 1, further comprising:

generating a second mapped filename for a second file, wherein the second file is a network page and the first file is a content component used within the network page;

storing the first file within the first directory of the cache using the first mapped filename; and storing the second file within a second directory of the cache using the second mapped filename.

8. The method of claim 1, further comprising:

generating a content component after determining whether the first file is in the cache; and storing the content component in the cache, wherein the content component is stored using the first mapped filename.

9. The method of claim 1, wherein, hierarchically, the first directory lies between a root directory of the cache and the first file.

10. The method of claim 1, further comprising:

setting a predetermined limit on a number of items to be stored within the first directory; and creating a second directory in response to the number of items within a first directory getting close to or reaching the predetermined limit for the first directory.

11. The method of claim 1, further comprising:

estimating a number of files to be stored within a data processing system cache;

creating a directory structure to distribute the files between directories before generating the first mapped filename; and storing files in the data processing system cache in accordance with the directory structure.

12. A computer readable medium having code embodied therein, the code comprising:

an instruction for generating a first mapped filename to manage the number of files within a first directory of a cache; and an instruction for determining whether the first file is in a cache by using the first mapped filename, wherein content within the cache is arranged hierarchically in a directory structure based on the distribution of content within the cache and the directory structure of the cache is dynamically re-configured based on the distribution of the content within the cache.

13. The computer readable medium of claim 12, wherein the code further comprises an instruction for parsing a client request received from a client computer to form a parsed element that represents a value of a first parameter, wherein the value of the first parameter corresponds to a name of the first directory.

14. The computer readable medium of claim 13, wherein the code further comprises an instruction for hashing the parsed element to form a hashed value, wherein:

a second directory has a name corresponding to the hashed value;

the second directory is a subdirectory of the first directory; and the first file lies within the second directory.

15. The computer readable medium of claim 14, wherein the first parameter is a non-application-specific parameter, and the hashed value is generated from an application-specific parameter.

16. The computer readable medium of claim 14, wherein:

the first parameter is a locale, an operating system, a browser, or an address of the client computer; and the hashed value is generated from a type of file, a scripting environment, a markup language, or a query string.

17. The computer readable medium of claim 12, wherein the code further comprises:

an instruction for parsing the client request received from a client computer to form a parsed element; and an instruction for hashing the parsed element to form a hashed value, wherein the hashed value corresponds to a name of the first directory.

18. The computer readable medium of claim 12, wherein the code further comprises:

an instruction for generating a second mapped filename for a second file, wherein the second file is a network page and the first file is a content component used within the network page;

an instruction for storing the first file within the first directory of the cache using the first mapped filename; and an instruction for storing the second file within a second directory of the cache using the second mapped filename.

19. The computer readable medium of claim 12, wherein the code further comprises:

an instruction for generating a content component that is executed after and in response to an outcome from the instruction for determining whether the first file is in the cache; and an instruction for storing the content component in the cache, wherein the content component is stored using the first mapped filename.

20. The computer readable medium of claim 12, wherein, hierarchically, the first directory lies between a root directory of the cache and the first file.

21. The computer readable medium of claim 12, wherein the code further comprises:

an instruction for setting a predetermined limit on a number of items to be stored within the first directory; and an instruction for creating a second directory in response to the number of items within a first directory getting close to or reaching the predetermined limit for the first directory.

22. A method of using a cache comprising:
generating a first mapped filename for a first file to manage the number of files within a first directory of the cache; and
determining whether the first file is in the cache by using the first mapped filename, wherein content within the cache is arranged hierarchically in a directory structure based on the distribution of content within the cache;
analyzing the distribution of content within the directory structure of the cache; and
dynamically re-configuring the directory structure of the cache based upon the analysis.

* * * * *